June 10, 1924. 1,496,834
J. C. THOMPSON
PROCESS FOR THE DISPOSAL OF POULTRY MANURE
Filed April 29, 1922 2 Sheets-Sheet 1
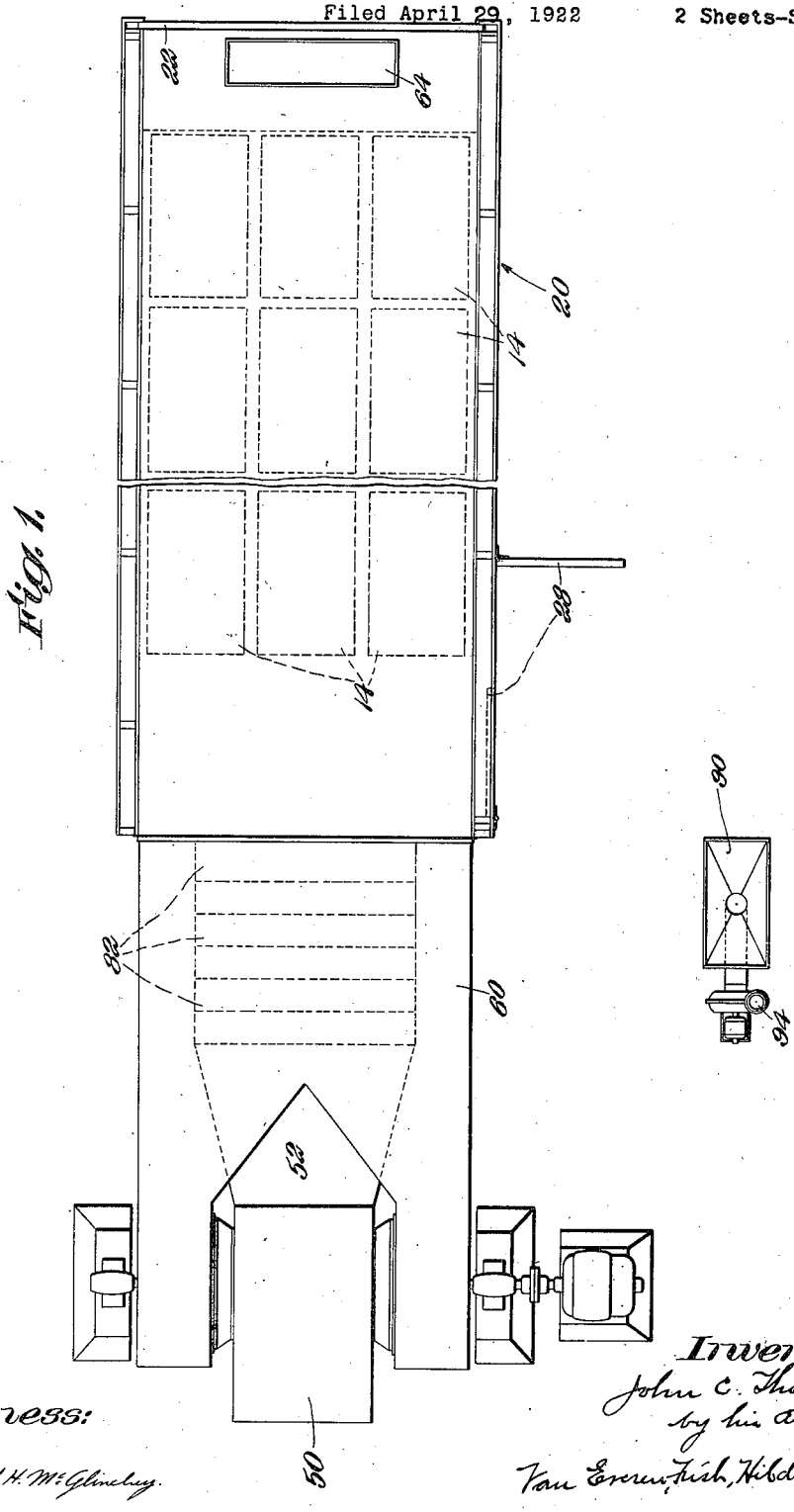

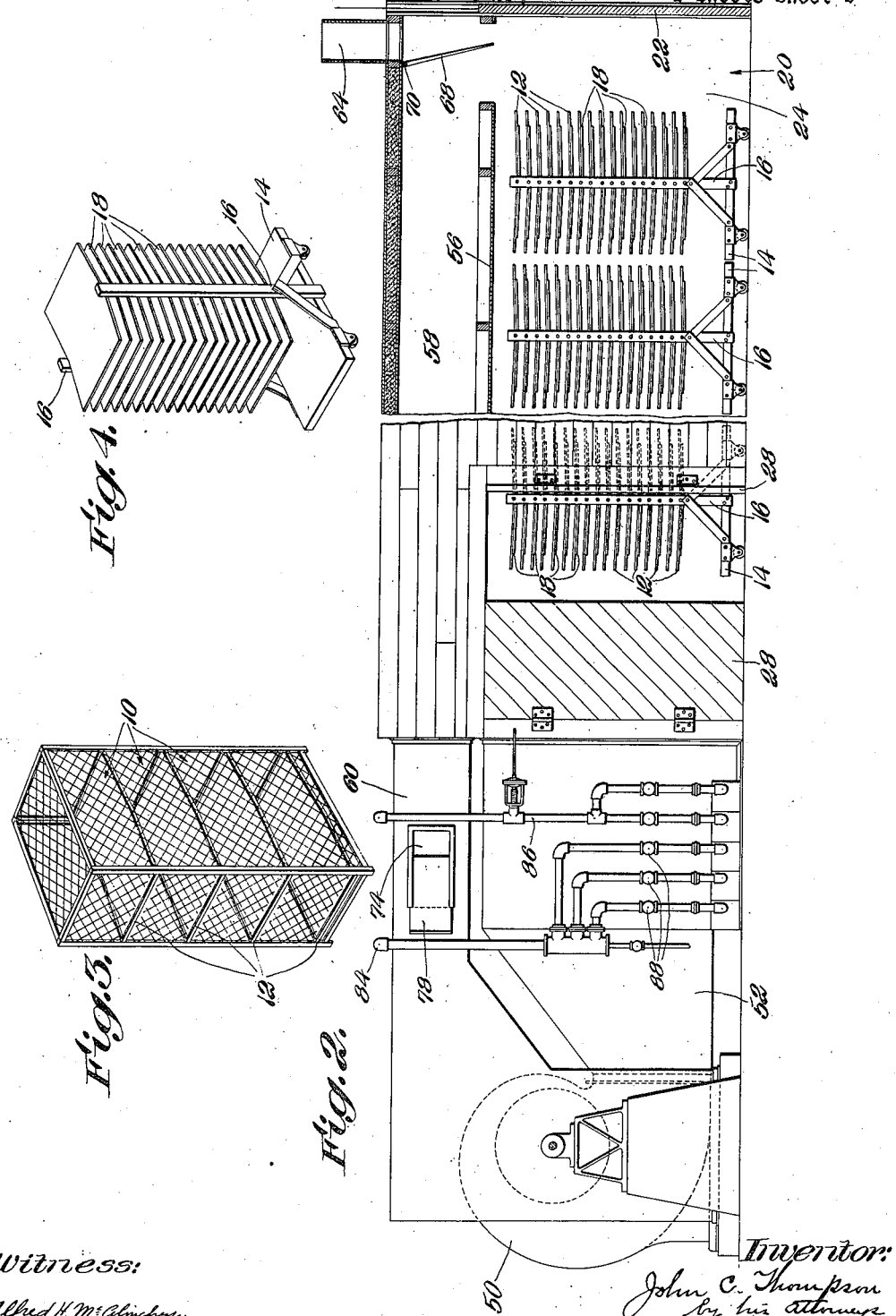

Patented June 10, 1924.

1,496,834

UNITED STATES PATENT OFFICE.

JOHN C. THOMPSON, OF CHICAGO, ILLINOIS, ASSIGNOR TO B. F. STURTEVANT COMPANY, OF HYDE PARK, MASSACHUSETTS, A CORPORATION OF MASSACHUSETTS.

PROCESS FOR THE DISPOSAL OF POULTRY MANURE.

Application filed April 29, 1922. Serial No. 557,475.

*To all whom it may concern:*

Be it known that I, JOHN C. THOMPSON, a citizen of the United States, residing at Chicago, in the county of Cook and State of Illinois, have invented certain new and useful Improvements in Processes for the Disposal of Poultry Manure; and I do hereby declare the following to be a full, clear, and exact description of the invention, such as will enable others skilled in the art to which it appertains to make and use the same.

This invention relates to a system for the disposal of poultry manure, and more particularly for the disposal of the poultry manure at the milk feeding stations of the large packing plants.

The object of the invention is to provide a novel system for the disposal of the manure particularly at the milk feeding stations at the large packing plants, by which the manure may be economically handled and dried to produce fertilizer having a relatively high nitrogen or ammonia content, and proportionately high commercial value.

At the large milk feeding stations of the packing plants the chickens, hens, ducks and geese are purchased from the farmers in the country surrounding the station, and are shipped to the milk feeding station in wooden cages, being purchased with empty crops at the prevailing market price. At the present time the poultry are then placed in metal coops or cages usually four stories in height, each story consisting of a wire compartment approximately 30" x 24" arranged to contain six fowl. These cages are usually arranged in groups or batteries of four, making a total of 96 fowl to each battery. Then the poultry are subjected to an intensive feeding program for a period of from 10 to 15 days, being fed milk, buttermilk and dried blood. Upon the floor of each compartment of the battery a removable galvanized steel pan is provided upon which the manure is collected. At the present time these pans are removed and cleaned each day, the manure being collected in a pile outside the building and this pile is carted away at intervals to a point outside the city or town and buried. At the present time it is necessary, in order to prevent the spread of vermin, infection and disease among the fowl, to carefully wash and spread lime and coal oil over the pans. The disposal of the poultry manure is, at the present time, generally regarded as a nuisance.

Attempts have been made to utilize the manure from the milk feeding stations for the purpose of fertilizer. These attempts have contemplated the drying of the manure with waste heat and the handling of the manure in bulk. Considerable difficulty has been encountered, not only because of the length of time needed for the drying operation because of the tendency of the material to form lumps and case-harden, but also because of the fact that the manure when dried contains only a relatively small ammonia content, and consequently had a relatively low value as a fertilizer.

According to the present invention, the manure is dried under carefully controlled conditions of temperature and humidity to the end, not only that the drying should be accomplished in a minimum time, but also in such manner as to retain in the dried manure a maximum nitrogen or ammonia content. In its preferred form the present system contemplates the handling and drying of the manure in the pans in which it is collected in the cages or coops, the pans being stacked in a removable rack or car and passed through a dryer in which the temperature and humidity conditions, above described, are carefully maintained. As the pans emerge from the dryer, the dried manure is scraped or dumped from the pans into a hopper from which it may be collected in bags, or otherwise, as may be desired. The dried pans may then be returned and again utilized in the coops or cages. In the present system the pans from which the dried manure is removed are sterilized so that the use of lime and coal oil is avoided.

Accordingly, the invention consists in the system of disposing of poultry manure hereinafter described and particularly defined in the claims.

In the drawings Figure 1 illustrates a plan of the layout of the dryer preferably utilized in the present system; Fig. 2 is a side elevation of the same, partly in section; Fig. 3 is a perspective of one of the sections of the coops or cages in which the poultry are housed at the milk feeding stations; and Fig. 4 is a perspective of one of the racks or cars for transporting a series of the pans through the dryer.

Referring to the drawing, when the poultry arrive at the milk feeding station, they are housed in lots of six in each compartment 10 of the battery of coops, a section of which is illustrated in Fig. 3. These coops are provided with removable pans or trays 12, preferably of galvanized iron arranged to be slid on suitable guides, not shown, upon the floor of each compartment 10. At the end of each day the trays or pans 12 upon which the manure has collected are removed from the floor of each compartment 10 and are immediately transferred to a rack 14. The rack 14 comprises a truck mounted upon wheels and having upright standards 16 provided with supporting devices 18 upon which the trays are placed. Each rack, when filled with trays, presents the appearance shown in Fig. 2 with the trays stacked one above the other, but affording ample space between succeeding trays for the circulation of a current of air over the manure during the drying operation, as will be described.

As fast as each rack 14 is filled with trays, it is manually pushed into the drying chamber of an elongated tunnel dryer 20 through the door 22, the latter being elevated at such time. The tunnel dryer 20 comprises an elongated chamber 24, the sides and top thereof being preferably of insulating material and having upon the floor tracks (not shown) for guiding the racks 14 longitudinally therethrough. As herein shown, the width of the chamber 24 is such as to afford space for the reception of three rows of drying racks. As each new rack carrying a fresh supply of pans is introduced through the door 22, progressive movement of the racks, and accordingly of the pans and manure to be dried, is caused to take place so that after the dryer has once been filled with racks, a rack containing the manure in a completely dried condition is removed through outlet doors 28 located at the end of the drying chamber 24 and at one side of the dryer, whenever a rack containing fresh manure to be dried is introduced through the door 22. The length of the drying chamber 24 necessary for the completion of the drying operation depends upon the quantity of manure, rate of air flow and the rate at which the pans are progressively advanced through the dryer, and considering all such factors, the length is made such that the manure emerges substantially bone dry.

Air for performing the drying operation is circulated longitudinally through the drying chamber 24 and between the stacked trays or pans 12 in the racks 14 therein and over the surface of the manure to be dried, by a blower 50 of any usual or preferred form. The discharge outlet of the blower 50 is connected by a conduit 52 to the dry end of the drying chamber 24 as shown in Fig. 2. The drying chamber 24 is provided at near the top thereof with a horizontally disposed partition 56 arranged to form a return passage 58 through which air from the drying chamber 24 is circulated. The return passage 58 is connected by a conduit 60 to the intake or suction side of the blower (see Figs. 1 and 2). A discharge or outlet pipe 64 is provided in the top of the drying chamber and the circulation of the air through the return passage 58 and the discharge through the outlet pipe 64 is controlled by a damper 68 pivoted at 70 to the top of the drying chamber and arranged to be manually operated by means not shown. Air is admitted to the suction side of the blower from without the dryer through an opening 74 in the conduit 60, the flow of air through the opening being controlled by a slide 78. As the air is discharged from the blower, provision is made for raising its temperature in order that the drying operation may proceed at the desired efficiency. For this purpose heating coils illustrated diagrammatically in Fig. 1 at 82 are supplied with steam from a source, not shown, to the series of pipes 84 and 86. The pipes 84 are preferably supplied with exhaust steam and the pipes 86 with live steam. Valves 88 in each of the pipes serve to afford means for controlling the temperature of the air within the drying chamber.

During the operation of the present system, as previously described, succeeding trucks filled with pans containing the manure to be dried are introduced within the drier, through the door 22, the latter being raised to permit the insertion of such truck and thereafter closed during the operation of the dryer. During the operation, after the drying chamber has been filled with trucks, it is obvious that as each succeeding truck is introduced through the gate 24, a truck containing the manure in a dried condition is positioned opposite the outer door and may be manually removed therethrough. Such a truck is then pushed over to the hopper 90 and the manure dumped therein from the several pans. This manure is elevated through the conduit 94 by a centrifugally operated blower to the bagging or packing house, where it may then be collected in bags or otherwise packed for convenience in handling.

In operating the dryer, the temperature of the air is preferably controlled so that the volatilization of the ammonia is reduced to a minimum amount. In practice, it has been found that operating the dry end of the drying chamber 24 at a temperature approximating 180 to 208 degrees and with the wet end at 150 to 162 degrees, satisfactory results have been obtained. The manure to be dried, as a general rule, has been found to contain somewhere in the neighborhood of 63% of moisture and in the condition in which it emerges from the dryer is substantially bone dry. The humidity within the dryer increases progressively from the dry or outlet end of the dryer toward the wet or inlet end of the dryer. On an average day the humidity at the dry end approximates 15% to 20% relative humidity at a dry bulb temperature of 180 to 208 degrees. The humidity increases progressively toward the wet end until at the wet end the humidity is somewhere in the neighborhood of 50% to 70% relative humidity at a dry bulb temperature of 150 to 162 degrees. Operating under such conditions it has been found that when the manure encounters the moist air at the wet end of the dryer, it is heated up throughout its mass without any substantial amount of evaporation or drying taking place. This eliminates the difficulty which may be regarded as "case-hardening" and which has been due heretofore to the rapid evaporation or drying of the outside of the material, so that in the present system as the material thereafter is progressively moved toward the dry end of the dryer, the evaporation and drying operation takes place gradually throughout the mass of the material and in this manner satisfactory drying is obtained in a minimum time and with a minimum loss of volatile nitrogen content, chiefly ammonia. The combined effect of the control of the humidity and temperature in the present system has enabled the drying of the manure while maintaining the ammonia content as high as 7% or 8%. This is exceedingly high for this class of material and the commercial value of the material is increased to a large extent thereby.

From the description thus far it will be observed that in the operation of the present system the manure is dried in pans in which it is collected and furthermore, that the pans remaining after the dried manure has been dumped into the hopper are in a dry sterile condition and may be conveniently returned again to the cages to be used after cleaning during the next day's run without the necessity of liming or the use of coal oil or other disinfectant to prevent the spread of infection, vermin or other contagious disease.

While the preferred manner in which the invention is practiced has been illustrated and described, it is to be understood that in its broader aspects it may be practiced in other ways within the scope of the following claims:

1. A process for the disposal of poultry manure at milk feeding stations which consists in collecting the manure in pans on the floor of the poultry pens, transferring the pans to carriers, progressively moving the carriers from the wet end to the dry end of a tunnel dryer, removing the dried manure from the pans, and replacing the pans in the pens.

2. A process for the disposal of poultry manure at milk feeding stations which consists in collecting the manure in pans on the floor of the pens, transferring the pans to racks, progressively moving the racks from the wet to the dry end of a tunnel dryer, maintaining the humidity and temperature within the tunnel dryer within such limits as to prevent volatilization of the nitrogen contents of the manure, removing the dried manure from the pans and utilizing the pans for the collection of additional manure.

3. A process for the disposal of poultry manure which consists in spreading the manure in layers and subjecting it while thus spread to the drying effect of a current of air under controlled conditions of temperature and humidity, whereby the manure is dried with a minimum loss of volatile nitrogen content.

4. A process for the disposal of poultry manure which consists in spreading the manure in layers and subjecting it while thus spread to a current of air, controlling the humidity of the air to cause the manure to be progressively subjected to decreasing degrees of humidity and maintaining the temperature of the air within such limits as to prevent appreciable volatilization of the nitrogen content of the manure without decreasing the efficiency of the drying operation.

5. A process for the disposal of poultry manure which consists in collecting the manure in receptacles and drying the manure while retained in the receptacles under controlled conditions of temperature and humidity to thereby prevent volatilization of the nitrogen content of the manure.

6. A process for the disposal of poultry manure which consists in collecting the manure in receptacles, placing the receptacles in a stack with spaces between succeeding receptacles, subjecting the manure in receptacles thus stacked to the drying effect of a current of air and controlling the temperature and humidity of the air to prevent volatilization of the nitrogen content of the manure.

7. A process for the disposal of poultry manure which consists in collecting the manure in a pan on the floor of the poultry pen, drying the manure while retained in the pan, and removing the dried manure from the pan.

8. A process for the disposal of poultry manure at milk feeding stations which consists in causing the manure to pass through a tunnel dryer, circulating a current of air through the dryer, controlling the humidity of the air thus circulated so that the manure initially encounters air at 50% to 70% relative humidity at a dry bulb temperature of 152 to 162 degrees and thereafter encounters air at progressively decreasing humidity, and maintaining the temperature of the air within the dryer below 212 degrees.

9. A process for the disposal of poultry manure at milk feeding stations which consists in passing the manure through the tunnel dryer, recirculating the air through the dryer, heating the air thus circulated, and controlling the temperature and humidity thereof by the admission of fresh air to the circulating air, whereby the manure is dried with a minimum loss of volatile nitrogen content.

JOHN C. THOMPSON.